Feb. 18, 1969

L. P. GAJDA ET AL 3,427,907

PROFILE MACHINING APPARATUS

Filed Oct. 10, 1966

INVENTORS
LEO P. GAJDA &
FRANK A. HEVONKOSKI
BY
Barnes, Kisselle, Raisch & Choate
ATTORNEYS

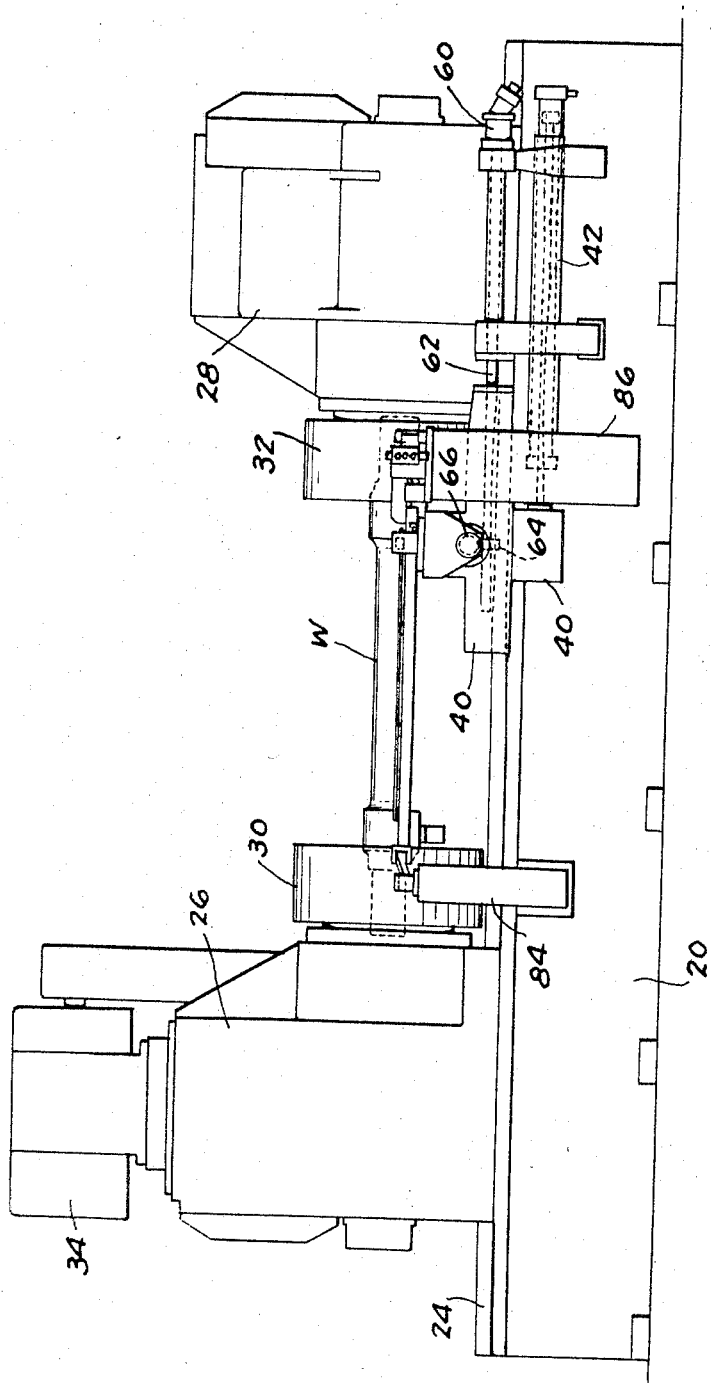

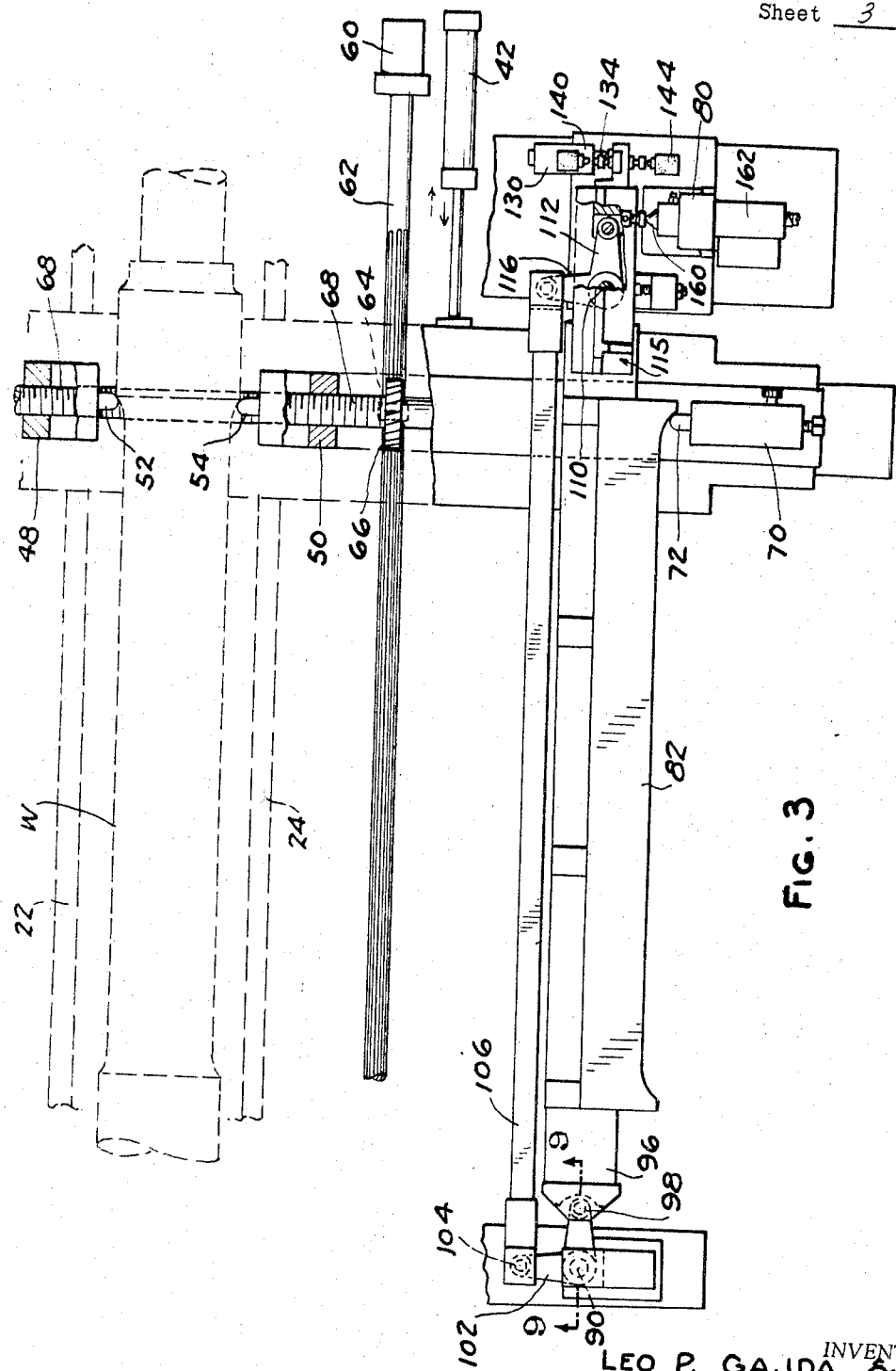

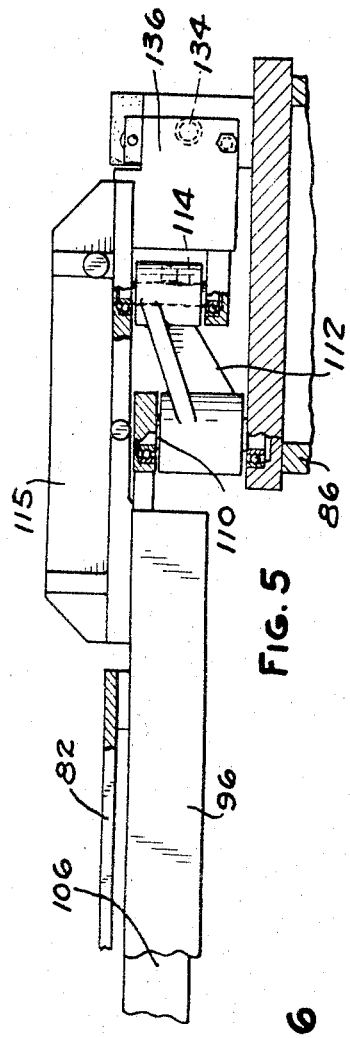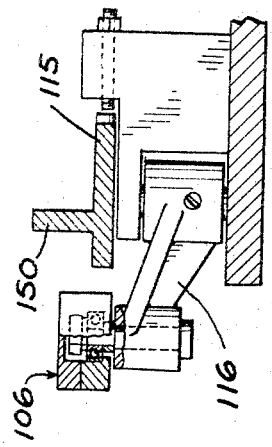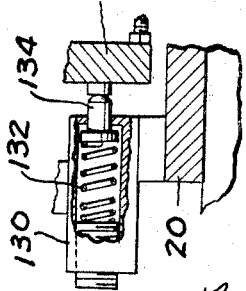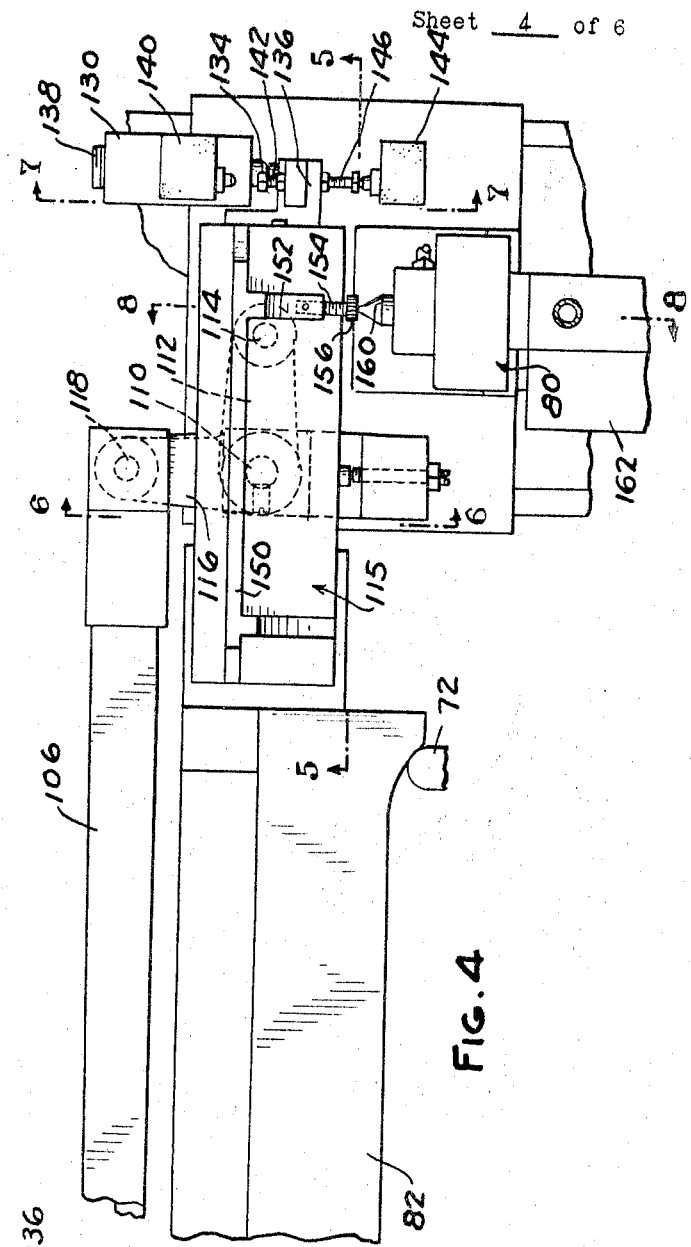

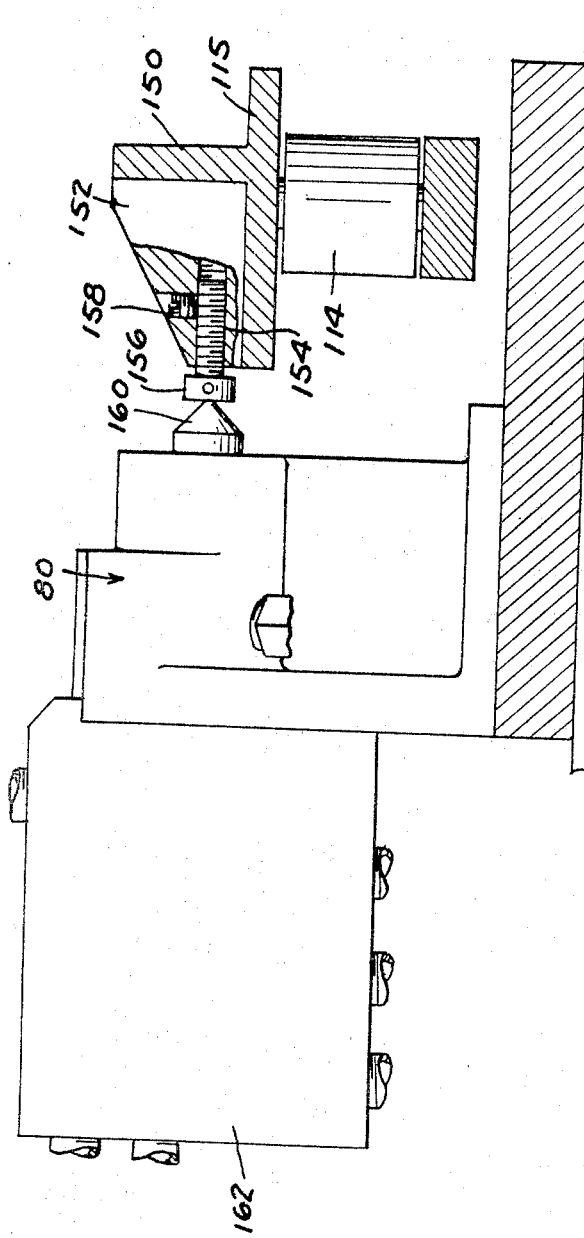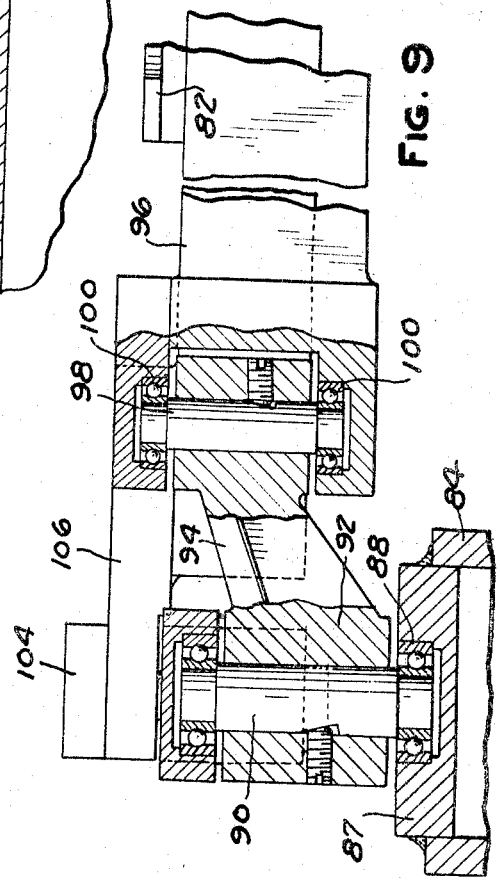

INVENTORS
LEO P. GAJDA &
FRANK A. HEVONKOSKI
BY
Barnes, Kisselle, Raisch & Choate
ATTORNEYS United States Patent Office 3,427,907
Patented Feb. 18, 1969

3,427,907
PROFILE MACHINING APPARATUS
Leo P. Gajda and Frank A. Hevonkoski, Detroit, Mich., assignors to Snyder Corporation, Detroit, Mich., a corporation of Michigan
Filed Oct. 10, 1966, Ser. No. 585,696
U.S. Cl. 82—14                                5 Claims
Int. Cl. B23b 3/28, 3/04, 5/14

ABSTRACT OF THE DISCLOSURE

An apparatus for machining contours wherein a rotating work piece is associated with a tool carriage and a tool cross slide in which a template is mounted in a relatively stationary position on the machine independently of the tool carriage, the template being movably mounted so that any departure of the tool cross slide from the template will be reflected in a servo mechanism which will bring a response in the cross slide, thus making it possible to mount the servo control and the cross slide power device in a stationary position on the machine with only mechanical contact points between the template and the servo for control.

---

This invention relates to a profile machining apparatus, and more particularly to a machine for handling heavy work pieces and for imparting thereto a profiled contour along the axis.

In machines of this kind, it has been common to mount the work piece for rotation on a suitable machine bed and to guide a tool by placing a stylus on a tool slide together with a servo device in such a manner that as the tool moves longitudinally of the work on the tool slide carriage, the stylus will follow a contour template which causes actuation of a servo mechanism on the tool slide which in turn moves the slide so the tool will cut the proper contour on the work.

It will be seen that with a device of this kind, the pressure tubes or power lines and other power apparatus connected with the servo motors must move with the tool slide, and, accordingly, the tool slide carriage is cluttered with the various wires, pipes and tubes that are necessary to accomplish the proper tool following motion.

It is an object of the present invention to provide a mechanism for effecting a tool following action which avoids the necessity of traveling power lines and permits a permanent power set-up on the stationary portions of the machine.

It is a further object of the invention to provide a machine tool assembly and apparatus which will impart an accurate contour longitudinally of a rotating piece of work within the specified limits by utilizing a novel template mount which reflects directly against a stationary servo control for a tool slide.

Other objects and features of the invention relative to the construction and operation will be apparent in the following description wherein the principle of operation and the manner of use are described in connection with what is considered to be the best mode contemplated for carrying out the invention.

Figure 1:
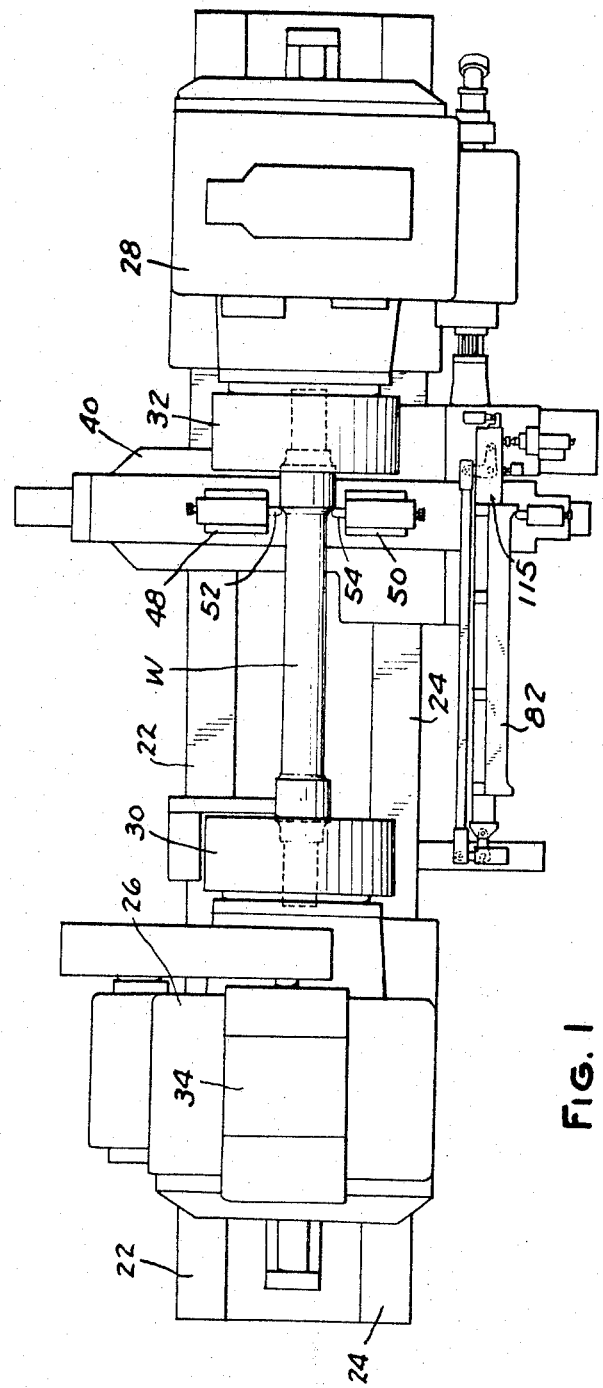
Figure 10:
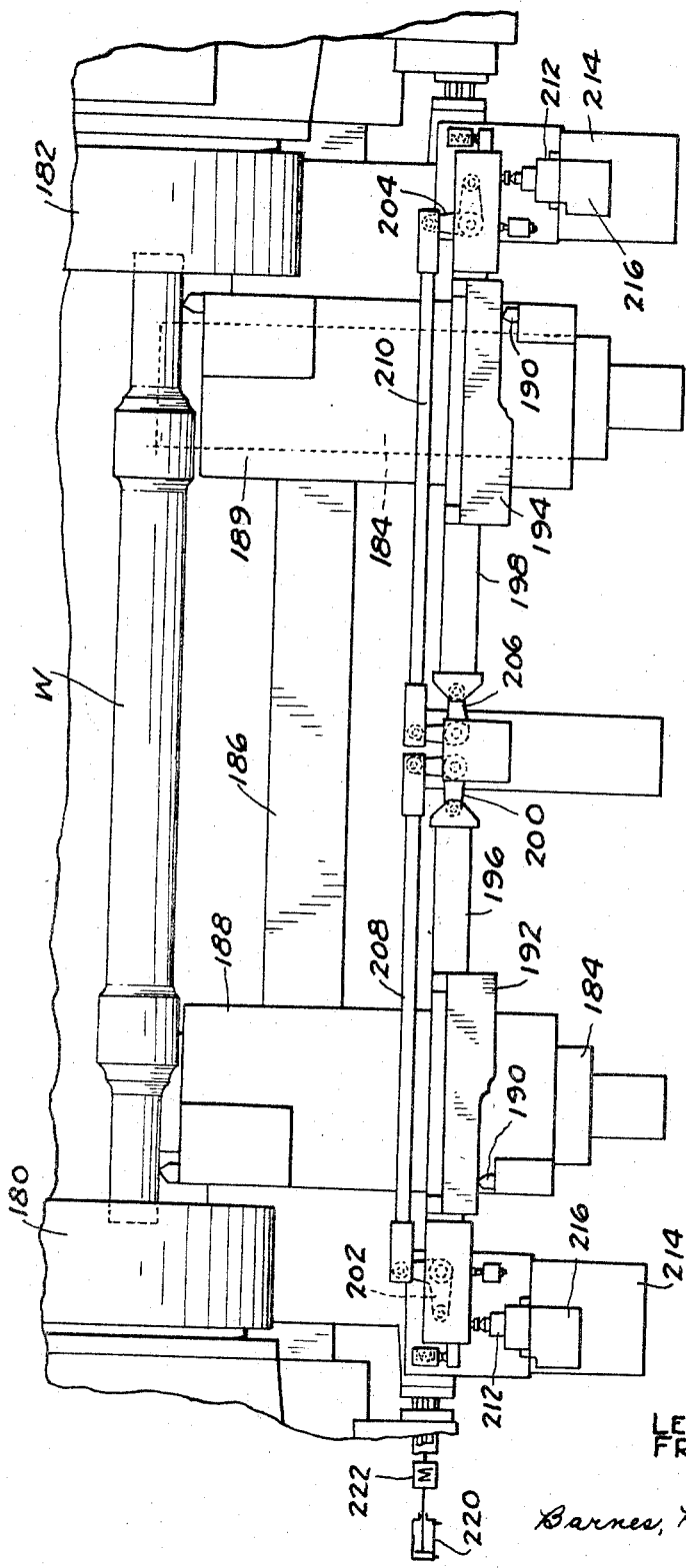

Drawings accompany the disclosure and the various views thereof may be briefly described as:

FIGURE 1, a plan view of the machine assembly.
FIGURE 2, a front view of the machine as shown in FIGURE 1.
FIGURE 3, an enlarged plan view of the template system and tool operating means.
FIGURE 4, an enlarged view of a right-hand portion of FIGURE 3 showing details of construction.
FIGURE 5, a sectional view illustrating a template mount taken on line 5—5 of FIGURE 4.
FIGURE 6, a sectional view of the template mount taken on line 6—6 of FIGURE 4.
FIGURE 7, a sectional view of a pressure spring assembly taken on line 7—7 of FIGURE 4.
FIGURE 8, a sectional view on line 8—8 of FIGURE 4 illustrating template-servo-contact.
FIGURE 9, a sectional view at line 9—9 of FIGURE 3 illustrating a template mount structure.
FIGURE 10, a plan view of a modified structure utilizing a tool slide at each end of a rotating part.

Referring to the drawings:

In FIGURES 1 and 2, a machine is shown having a base 20 with horizontal ways 22 and 24 carrying relatively massive heads 26 and 28 each furnished with a holding chuck 30 and 32. A motor 34 on head 26 provides a drive for chuck 30 which drives a work piece W such as a railroad car wheel axle.

Also mounted on the machine base is a carriage slide mechanism 40 which is mounted to have a motion along the ways 22-24 in a feed travel by reason of a piston-cylinder feed assembly 42 actuated in a conventional way by a hydraulic control. On the carriage 40 are mounted cross slides 48 and 50 for carrying tools 52 and 54 which act on the work piece W.

The tool cross slides 48 and 50 are controlled in their position relative to the work by a fluid motor 60 which rotates a shaft 62 on which there is located a worm gear 64 which drives a worm gear 66 on a cross shaft 68 on the carriage 40. This cross shaft has right and left-hand threads which control the position of the tool slides 48 and 50 symmetrically so that the cutting tools 52 and 54 will move toward the work at the same rate.

In order to have the drive for the tool cross slides continue as the carriage moves along the ways of the machine, the worm gear 64 is captive on the carriage but has a splined relation to the shaft 62. This gear relationship allows high speed action of the shaft and removes error due to torque load.

Also positioned on the tool slide carriage 40 is a stylus mount block 70 carrying a stylus 72 which is positioned on the center line of the tools 52-54. The stylus 72 is suitably mounted for adjustment to make the initial positioning possible relative to the tools. The tool positioning motor 60 is associated in a servo relationship, in this instance, hydraulically, with a servo mechanism 80, it being the purpose of the servo mechanism to reflect the desired curvature for the work and to direct the tools into the work or out of the work to obtain this curvature.

According to the present invention, the servo mechanism is controlled by a parallelogram mount which carries a template bar 82. The mount is such that it is intended that any pressure on the bar 82 at any point along its length will move the bar transversely of the axis of the work and the machine with the bar always maintained in a position parallel to the axis of the work.

This parallelogram mount is accomplished by a support tube 84 at the left-hand end of the machine base adjacent chuck 30 and by a support tube 86 at the right-hand end of the machine base adjacent chuck 32, these supports being firmly anchored on the machine base 20. On the support 84 (FIGURE 9) is a top plate 87 which carries a top and bottom bearing 88 mounting a post 90 on which is mounted a bell crank lever having a central pivot portion 92 with an arm 94 extending to the right where it is pivotally associated with the template support bar 96 by a bearing post 98 and upper and lower bearings 100. The bell crank lever body 92 also has a rearwardly extending arm 102 (FIGURE 3) which is suitably monuted by a post and bearing assembly 104 in relation to a stabilizer link 106.

At the other end of the assembly there is a similar mounting as shown best in FIGURES 4, 5 and 6. A main bearing post 110 again supports a bell crank lever having an arm 112 extending to the right, which, at its outer end, has a bearing post 114 to support, a right-hand extension plate 115 of the template support bar 96.

It will be noted that the extension plate 115 is attached to the top of the template bar 96 so that it extends above the pivot assembly just described so that it may reach the far pivot 114 referred to. This plate 115 has also functions in the control system as will be later described. A rearwardly extending arm 116 has a bearing post assembly 118 which is pivotally connected to the right-hand end of the link 106. With this parallelogram mounting system, it will be seen that the template plate 82 mounted on the template support bar 96 will remain always in a position parallel to the axis of a work piece and the axis of rotation of the machine.

Mounted on the machine base is also a spring case 130 containing a spring 132 (FIGURE 7) which urges outwardly a plunger 134. On the right-hand end of the extension plate 115 is solidly affixed a depending plate 136 which positions in front of the plunger 134. An adjustment screw 138 at the back of the spring container 130 permits regulation of the spring pressure.

Also mounted on the spring case 130 is a limit switch 140 positioned to contact an adjustable post 142 on the plate 136 and forward of this plate is also another limit switch 144 positioned to be actuated by an adjustable post 146. Limit switch 140 is designed to switch the tool feed from rapid traverse to servo control. Limit switch 144 registers overtravel or failure of the servo mechanism and can actuate an emergency return motion for the tools.

Plate 115 has a ridge bar 150 extendtng longitudinally thereof and extending forwardly from this bar is a web 152 (see FIGURE 8) which carries a horizontal screw 154 having a round head 156. A set screw 158 is positioned transversely of screw 154 to permit it to be locked securely in a longitudinal adjustment position. The screw 156 is positioned to contact a signal plunger 160 on a servo control device previously referred at 80. This servo control is electrically or hydraulically associated with the fluid motor 60 for purposes of controlling tool position as will be described. As the device is shown, it has a servo valve assembly housing in a casing 162 with suitable hydraulic lines associating it with the fluid motor 60. It will be seen that both the servo control mechanism and the associated valves and the fluid motor 60 are mounted on stationary parts of the machine so that it is not necessary to have flexible or extendable lines connecting these elements of the system.

In the operation of the system as described, it will be seen that the pressure of the spring plunger 134 acting on the depending bracket 136 on the end of plate 115 will urge the shaped template 82 forward against the probe 72. The work piece W is mounted in the chucks 30 and 32 so that it is centered longitudinally in these chucks as well as radially so that the work to be done on the part will be properly related to the ends of the part.

The servo mechanism 80 is connected to respond to the motion of the template bar 82 as reflected through the bar carrier 96 and the stylus is so adjusted relative to the template plate 115 and the servo mechanism is so adjusted that there will be .020" motion to null point. As the machine is started, the chucks will be rotating the work and the tools 52 and 54 will start a cutting action while at the same time the carriage 40 is moving along the work by reason of the action of the piston-cylinder combination 42. Any tendency on the part of the probe 72 to leave the bar 82 will cause the spring plunger 134 to press the servo mechanism to the point that the tool slide will move inwardly moving the probe 72 inwardly and the tool 54 inwardly toward the work. The tool 52 and the corresponding slide 48, as previously mentioned, is mounted in such a way that it will respond symmetrically to the motion tool 54. Correspondingly, any pressure of the probe 72 on the plate 82 which tends to displace it inwardly will cause a corresponding reaction in the fluid motor 60 which will withdraw the tool slide 50 and, accordingly, the probe 72.

Thus, with a relatively light touch, the probe can follow the template 82 and control the position of the tools 52–54 with extreme accuracy throughout the entire longitudinal transverse of the work. In contrast to previous sysstems, it will be seen that the servo mechanism does not have to travel with the tool slide by reason of the template mount.

In FIGURE 10, a modified structure is shown wherein two templates can be mounted on the same machine for controlling independent tools for machining opposite ends, for example, of a work piece W. FIGURE 10, which is a top view of a machine, shows the work mounted in chucks 180 and 182 suitably mounted for rotation by a power motor. Tool carriages 184 are also mounted on ways 186 carrying tool cross slides 188 and 189. On each tool slide, which is positioned to move transversely of the machine, is a probe 190 to cooperate with respective template plates 192 and 194 mounted on carrier bars 196 and 198 which carries the templates in the parallelogram relationship previously described.

The bar 196 is mounted at its opposite ends on the bell crank arms 200 and 202, and the bar 198 is mounted on its opposite ends on the bell crank levers 204 and 206, there being provided connecting links 208 and 210 to complete the parallelogram frame work. At each end of the machine then are the servo mechanisms indicated at 212 and mounted on suitable brackets 214 with the valve assemblies 216 which cooperate with a suitably positioned tool slide control motor (not shown) but of the same type as previously described in connection with FIGURE 1. At the left-hand end of FIGURE 10, the carriage feed motor 220 is diagrammatically shown together with a showing of a tool slide control motor 222. The operation of each of the follower units in the assembly shown in FIGURE 10 is identical with that of the one previously described and here again it will be seen that the system has the advantage that the servo control motor with its related valves is mounted on a stationary portion of the machine where it may be directly related with the tool slide motor in the servo relationship with permanent connections.

In each case, it will be seen that the system is such that the forward part of the machine can be clear of the connecting tubes and conduits which previously were necessary since they were mounted on the tool carriage and had to move with it. The present device simplifies greatly the tool design and makes it also possible for an operator to have much better access to the work and the machine in general.

What is claimed as new is as follows:

1. In a contour machining apparatus of the type including a base, a means on said base for mounting a work piece for rotation, a tool carriage to move along said work and a tool cross slide on said carriage carrying a tool to perform work on a work piece, that improvement which comprises:
 (a) a power output means on said base movable to control the position of the cross slide on said carriage and relative to said work,
 (b) a control input means on said base to control motion of said power output means,
 (c) a signal means on said base extending along the path of said carriage comprising:
  (1) a template bar contoured to the desired contour of the finished work piece,
  (2) a mounting for said template bar to provide movement of said bar toward and way from the axis of rotation of said work,
 (d) a stylus on said tool slide movable therewith to contact the contoured portion of said template, and (e) means connecting said template bar and said control input means wherein movement of said bar as influenced by said stylus is reflected in tool follow-up to impress proper contour on a work piece.

2. An apparatus as defined in claim 1 in which the power output means and the control input means comprise a power servo-system mounted on said base in permanent position relative to each other.

3. An apparatus as defined in claim 1 in which said template bar is based toward said stylus, and the means connecting said template bar and said control input comprises a projection on said mounting adjustable to contact said control input means which is movable in response to the position of said bar.

4. An apparatus as defined in claim 1 in which the mounting for said template bar comprises a parallelogram linkage including two parallel members mounted respectively on the corresponding arms of pivoted bell crank levers wherein the template bar mounted on one of said members can move transversely to the axis of rotation of the work while remaining always in a position parallel to said axis.

5. In a contour machining apparatus of the type including a base, a means on said base for mounting a work piece for rotation, a tool carriage to move along said work, and a tool cross slide on said carriage carrying a tool to perform work on a work piece, that improvement which comprises:

(a) a servo control mounted in a stationary position on said base for positioning said tool relative to the work piece, (b) means also on said base to transmit motion from said control to the tool cross slide on the moving carriage, and (c) means on said base mounted independently of said carriage comprising:
  (1) a template bar mounted for control motion only in response to movement of said tool cross slide away from a predetermined contour path,
  (2) means operably connecting said bar and said servo control to initiate response in said servo mechanism wherein said tool cross slide is moved in a predetermined contour path related to said template bar.

References Cited

UNITED STATES PATENTS

| 2,316,405 | 4/1943 | Clausen | 82—14 |
| 2,646,651 | 7/1953 | Wilson | 51—100 |
| 2,531,340 | 11/1950 | Mathys | 51—100 |
| 3,156,144 | 11/1964 | Weaver | 82—14 |
| 3,176,552 | 4/1965 | Weaver | 82—14.1 |
| 3,194,092 | 7/1965 | Piotrowski | 82—14 |

GERALD A. DOST, *Primary Examiner.*

U.S. Cl. X.R.

51—100